US012708879B2

(12) United States Patent
Monji et al.

(10) Patent No.: US 12,708,879 B2
(45) Date of Patent: Aug. 18, 2026

(54) SURFACE-TREATED POROUS MATERIALS HAVING FILTRATION PROPERTIES AND METHODS OF PREPARING THEM

(71) Applicant: ACULON, INC, San Diego, CA (US)

(72) Inventors: Majid Monji, San Diego, CA (US); Eric L. Bruner, La Jolla, CA (US); Eric L. Hanson, Carlsbad, CA (US)

(73) Assignee: ACULON, INC., San Diego, CA (US)

( * ) Notice: Subject to any disclaimer, the term of this patent is extended or adjusted under 35 U.S.C. 154(b) by 487 days.

(21) Appl. No.: 18/199,840

(22) Filed: May 19, 2023

(65) Prior Publication Data

US 2023/0311070 A1 Oct. 5, 2023

Related U.S. Application Data

(63) Continuation of application No. PCT/US2021/060001, filed on Nov. 19, 2021.

(Continued)

(51) Int. Cl.

| | |
|---|---|
| ***B01D 69/02*** | (2006.01) |
| ***B01D 53/22*** | (2006.01) |
| ***B01D 61/36*** | (2006.01) |
| ***B01D 67/00*** | (2006.01) |
| ***B01D 69/10*** | (2006.01) |
| ***B01D 71/26*** | (2006.01) |

(Continued)

(52) U.S. Cl.

CPC ........... *B01D 69/02* (2013.01); *B01D 53/228* (2013.01); *B01D 61/36* (2013.01); *B01D 67/0088* (2013.01); *B01D 67/00931* (2022.08); *B01D 69/1071* (2022.08); *B01D 71/26* (2013.01); *B01D 71/32* (2013.01); *B01D 71/48* (2013.01); *B01D 2323/216* (2022.08); *B01D 2323/2182* (2022.08); *B01D 2323/219* (2022.08); *B01D 2323/36* (2013.01); *B01D 2325/04* (2013.01)

(58) Field of Classification Search

None

See application file for complete search history.

(56) References Cited

U.S. PATENT DOCUMENTS 8,075,669 B2 * 12/2011 Meindl .................. B01D 71/32 95/46

FOREIGN PATENT DOCUMENTS

TW 202005698 A * 2/2020 ............ B01D 61/58

* cited by examiner

*Primary Examiner* — Krishnan S Menon

(74) *Attorney, Agent, or Firm* — Blynn L. Shideler; Krisanne Shideler; BLK Law Group

(57) ABSTRACT

The present invention is directed to surface-treated membranes comprising: (a) a porous substrate; and (b) a coating layer applied to the substrate. The coating layer is formed from a surface treatment composition comprising: (i) a first component comprising an organic solvent; and (ii) a second component comprising a fluorine-containing polymer and a solvent containing at least one C—F bond. The present invention is further drawn to a method of preparing a surface-treated filtration membrane, comprising: (a) contacting a porous substrate with a first component of a surface treatment composition, wherein the first component comprises an organic solvent; (b) subsequently contacting the porous substrate with a second component of the surface treatment composition, wherein the second component comprises a fluorine-containing polymer and a solvent containing at least one C—F bond; and (c) subjecting the porous substrate to a temperature of 25 to 90° C. for 1 to 180 minutes.

5 Claims, 1 Drawing Sheet

Related U.S. Application Data

(60) Provisional application No. 63/116,196, filed on Nov. 20, 2020.

(51) Int. Cl.
*B01D 71/32* (2006.01)
*B01D 71/48* (2006.01)

SURFACE-TREATED POROUS MATERIALS HAVING FILTRATION PROPERTIES AND METHODS OF PREPARING THEM

RELATED APPLICATIONS

The present application is a continuation of International Patent Application Serial Number PCT/US2021/060001 titled "Surface-Treated Porous Materials having Filtration Properties and Methods of Preparing Them" filed Nov. 19, 2021 and which published May 27, 2022, which application and publication is incorporated herein by reference.

International Patent Application PCT/US2021/060001 claims priority of U.S. Provisional Patent Application Ser. No. 63/116,196 filed Nov. 20, 2020.

FIELD OF THE INVENTION

The present invention relates to surface-treated filtration membranes and methods of preparing them.

BACKGROUND OF THE INVENTION

Filters are commonly used in industrial, residential, and vehicular settings to remove, gas, liquid or solid particulates such as dust, pollen, mold, and bacteria from fluids including liquids and gases. Air filters, for example, are used in applications where air quality can affect the health of persons in a particular environment, such as an office space or vehicular cabin, and where particulates may damage or impede the operation of a device to which the filter is integral; for example, an air conditioner, internal combustion engine, air compressor, or gas turbine. Filtration media that can remove both macroscopic, particulate contaminants and molecular contaminants without becoming blocked or clogged are particularly desired. In particular, in settings where a filter may be exposed to hydrophobic contaminants including oils, fuels, or lubricants, which may in turn attract or trap particulates, it is essential that the filtration medium prevent buildup in pores to maintain fluid flow and maximize service life.

Gas (e.g., air or nitrogen) filters on HVAC units, industrial devices such as compressors, automobiles and small craft such as jet skis, scooters, motorcycles and motorbikes, lawn mowers, snow blowers, and watercraft may be made of organic polymeric materials. They are often treated by plasma-assisted deposition of PTFE for oil repellency. However, this treatment process may generate perfluorooctanoic acid (PFOA), which is now subject to regulatory action and voluntary industrial phase-outs due to health concerns. Treatment processes that involve heat drying or curing of coatings applied to the filtration medium are suitable for heat tolerant filtration substrates such as polyester, but may damage other commonly used membrane media, causing deformation or degradation.

U.S. Patent Application Publication Number 2019-0329185 discloses filter membranes that include a porous polymeric filter layer that is coated with a layer that contains cross-linked polyamide polymer, U.S. Pat. No. 10,072,173 discloses a coating composition includes a poly(methyl methacrylate) polymer or copolymer having a weight average molecular weight at least 50,000 grams per mole; monomer comprising at least one of an alkylene diacrylate, alkylene dimethacrylate, cycloalkylene diacrylate, or cycloalkylenedimethacrylate, wherein the at least one of an alkylene diacrylate, alkylene dimethacrylate, cycloalkylene diacrylate, or cycloalkylenedimethacrylate provides at least 80 percent by weight of the monomer; and a stabilizer against ultraviolet light.

It would be desirable to provide novel filtration membranes suitable for use on fluid streams that serve to remove contaminants while maintaining fluid flow over an extended period of the service life, and that may be produced in an environmentally friendly manner without the drawbacks of the prior art.

SUMMARY OF THE INVENTION

The present invention is directed to surface-treated filtration membranes comprising:

(a) a porous polymeric substrate; and (b) a coating layer applied to at least one surface of the substrate. The coating layer is formed from a surface treatment composition comprising:

(i) a first component comprising an organic solvent having a boiling point less than or equal to 100° C. at atmospheric pressure; and (ii) a second component comprising:

(1) a fluorine-containing polymer; and (2) a solvent containing at least one C—F bond. The solvent (2) is different from the organic solvent in the first component (i).

The present invention is further directed to a method of preparing a surface-treated filtration membrane. The method comprises:

(a) contacting a porous polymeric substrate with a first component of a surface treatment composition, wherein the first component comprises an organic solvent having a boiling point less than or equal to 100° C. at atmospheric pressure;

(b) subsequently contacting the porous polymeric substrate with a second component of the surface treatment composition, wherein the second component comprises:

(1) a fluorine-containing polymer; and (2) a solvent containing at least one C—F bond, wherein the solvent containing at least one OF bond is different from the organic solvent in the first component; and (c) subjecting the porous polymeric substrate to a temperature of 25 to 90° C. for 1 to 180 minutes to form a surface-treated filtration membrane.

DETAILED DESCRIPTION OF THE INVENTION

Figure 1:
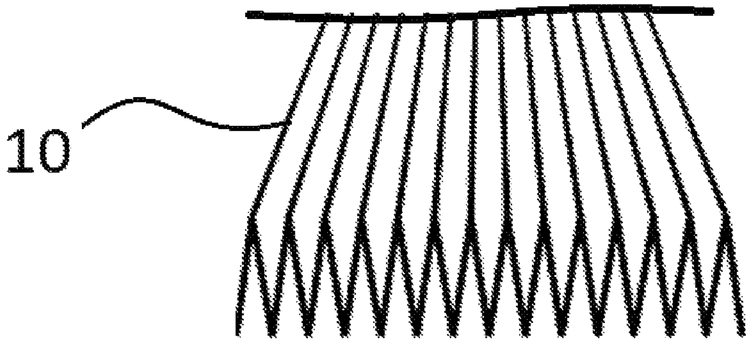
FIG. 1 is a schematic perspective view of a portion of a pleated surface-treated filtration membrane according to one aspect of the invention.

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The various embodiments and examples of the present invention as presented herein are each understood to be non-limiting with respect to the scope of the invention.

As used in the following description and claims, the following terms have the meanings indicated below:

By "polymer" is meant a polymer including homopolymers and copolymers, and oligomers. By "composite material" is meant a combination of two or more differing materials.

As used herein, "formed from" denotes open, e.g., "comprising," claim language. As such, it is intended that a composition "formed from" a list of recited components be a composition comprising at least these recited components, and can further comprise other, nonrecited components, during the composition's formation.

An "organic material," as used herein, means carbon containing compounds wherein the carbon is typically bonded to itself and to hydrogen, and often to other elements as well such as silicon, and excludes binary compounds such as the carbon oxides, the carbides, carbon disulfide, etc.; such ternary compounds as the metallic cyanides, metallic carbonyls, phosgene, carbonyl sulfide, etc.; and carbon-containing ionic compounds such as metallic carbonates, for example calcium carbonate and sodium carbonate. See R. Lewis, Sr., Hawley's Condensed Chemical Dictionary, (12th Ed. 1993) at pages 761-762, and M. Silberberg, Chemistry The Molecular Nature of Matter and Change (1996) at page 586, which are specifically incorporated by reference herein.

As used herein, the term "inorganic material" means any material that is not an organic material.

As used herein, a "thermoplastic" material is a material that softens when exposed to heat and returns to its original condition when cooled to room temperature. As used herein, a "thermoset" material is a material that solidifies or "sets" irreversibly when heated.

As noted above, the present invention is directed to surface treated filtration membranes 10. The membranes comprise a porous polymeric substrate 12, typically in the form of a sheet having opposing surfaces, and may be woven, nonwoven, knit, or perforated. The sheet may be pleated as shown in FIG. 1, flat spiral, convex or concave with respect to fluid flow, or in any other configuration known in the filtration art. It may be rigid or flexible. Often the substrate 12 comprises an air filter, although other filters, such as a filter for oil or water, is suitable. In certain examples of the present invention, the substrate 12 may be made of a polyester and/or a polyolefin polymer. Polyolefins are polymers derived from at least one ethylenically unsaturated monomer. The monomers may contain heteroatoms such as fluorine or chlorine. Suitable examples of monomers include ethylene, propylene, butene, hexene, octene, and fluoromonomers such as tetrafluoroethylene. Note that the phrase "and/or" when used in a list is meant to encompass alternative embodiments including each individual component in the list as well as any combination of components. For example, the list "A, B, and/or C" is meant to encompass seven separate embodiments that include A, or B, or C, or A+B, or A+C, or B+C, or A+B+C.

Examples of polymers used to prepare the porous substrate 12 may include polyethylene, polypropylene, polybutene, and PTFE. High density and/or ultrahigh molecular weight polyolefins such as high-density polyethylene are also suitable. Copolymers of two or more monomers may also be used.

Non-limiting examples of ultrahigh molecular weight (UHMW) polyolefin can include essentially linear UHMW polyethylene or polypropylene. In as much as UHMW polyolefins are not thermoset polymers having an infinite molecular weight, they are technically classified as thermoplastic materials.

The ultrahigh molecular weight polypropylene can comprise essentially linear ultrahigh molecular weight isotactic polypropylene. Often the degree of isotacticity of such polymer is at least 95 percent, e.g., at least 98 percent.

Lower molecular weight polyethylene (LMWPE) is also suitable as a substrate. LMWPE is a thermoplastic material and many different types are known. One method of classification is by density, expressed in grams/cubic centimeter and rounded to the nearest thousandth, in accordance with ASTM D 1248-84 (Reapproved 1989). Non-limiting examples of the densities of LMWPE and other exemplary polymers are found in the following Table 1.

TABLE 1

| Type | Abbreviation | Density, g/cm$^3$ |
|---|---|---|
| Low Density Polyethylene | LDPE | 0.910-0.925 |
| Medium Density Polyethylene | MDPE | 0.926-0.940 |
| High Density Polyethylene | HDPE | 0.941-0.965 |
| Polypropylene | PP | 0.95 |
| Polytetrafluoroethylene | PTFE | 2.20 |

Any or all of the polymers listed in Table 1 above may be used as the porous substrate 12. Other suitable polymers for use as the porous substrate 12 include polyphenylene sulfide (PPS), polyether sulfone (PES), polyethylene terepthalate (PET), polyvinylidene fluoride (PVDF), cellulose acetate, polyamide, and polyimide. One or more of the polymers above may be used together.

As noted, combinations of organic polymers may be used as the porous substrate 12. Other thermoplastic polymers may also be present. Non-limiting examples of thermoplastic organic polymers that optionally may be present in the substrate include copolymers of ethylene and propylene, copolymers of ethylene and acrylic acid, and copolymers of ethylene and methacrylic acid. If desired. all or a portion of the carboxyl groups of carboxyl-containing copolymers can be neutralized with sodium, zinc or the like.

Figure 2:
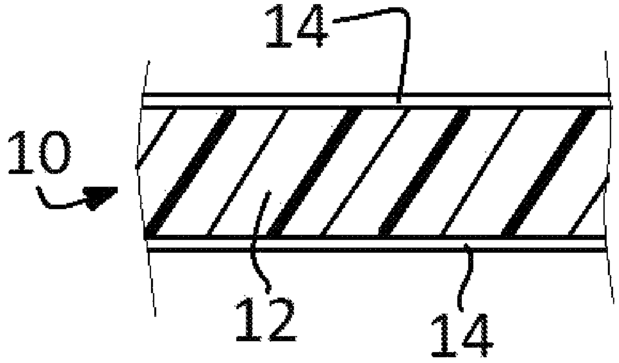
FIG. 2 is a schematic cross-sectional view of a surface-treated filtration membrane of the present invention.

The surface-treated filtration membranes of the present invention further comprise (b) a coating layer 14 applied to at least one surface of the substrate 12, usually at least the surface oriented toward a fluid influent. Often, the coating layer is applied to the entire substrate surface, particularly when the coating layer is applied by immersion. FIG. 2 illustrates an exemplary surface-treated filtration membrane 10 of the present invention, with a coating layer 14 applied to two opposing surfaces of a porous polymeric substrate 12. The coating layer 14 is formed from a surface treatment composition comprising (i) a first component comprising an organic solvent having a boiling point less than or equal to 100° C. For the purposes of this application, all boiling points are reported at atmospheric pressure. By atmospheric pressure is meant 1 atm (i.e., ca. 14.7 psi, or 760 torr). The boiling point of the organic solvent may also be at least 50° C., or at least 65° C., or at least 80° C., such that the boiling point of the organic solvent may range from 50 to 100° C., or 65 to 100° C., or 80 to 100° C. The use of solvents having such boiling points facilitates the formation of a coating layer 14 on the substrate 12 at ambient or slightly elevated temperatures (such as up to 110° C., or up to 90° C.) and prevents heat deformation or other heat damage to the substrate that may be caused by higher temperatures; higher processing temperatures are not necessary to prepare the surface-treated filtration membranes of the present invention. Ambient temperature typically ranges from 60 to 90° F. (15.6 to 32.2° C.), such as a typical room temperature, 72° F. (22.2° C.).

Examples of suitable solvents include one or more of isopropanol, n-propanol, 2-butanol, acetone, methyl ethyl ketone (MEK), t-butyl acetate, methyl acetate, and hexamethyldisiloxane. It may be desirable, though it is not necessary for technical reasons, to use a solvent having a boiling point less than or equal to 100° C. and that is classified as "VOC Exempt" by the United States Environmental Protection Agency (USEPA). The use of such solvents allows for a very environmentally friendly ("green") process of preparing the membranes of the present invention.

The surface treatment composition used to form the coating layer 14 on the substrate 12 further comprises (ii) a second component, which in turn comprises (1) a fluorine-containing polymer and (2) a solvent containing at least one C—F bond. The fluorine-containing polymer (1) is typically an addition polymer of ethylenically unsaturated monomers, at least one of which contains fluorine.

The polymers may be any polymers that contain fluorocarbon (i.e., C—F) units, such as —$C(F)_2$—, —C(F)(H)—, and/or terminal units such as —$C(F)_x(H)_y$, wherein x is greater than or equal to 1 and x+y=3. The fluorine-containing polymer (a) is often a (meth)acrylic polymer. By "(meth) acrylic" is meant polymers prepared from monomers having acrylic functional groups, polymers prepared from monomers having methacrylic functional groups, and/or polymers prepared from both types of monomers. The polymers are typically prepared from acrylic and methacrylic monomers such as acrylic acid, methacrylic acid, and esters thereof. Useful alkyl esters of acrylic acid or methacrylic acid include aliphatic alkyl esters containing from 1 to 30, and often 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride, vinyl esters such as vinyl acetate or ethers such as vinyl trifluoromethyl ether. Fluoro-functional monomers such as chlorotrifluoroethylene, monofluoroethylene, difluoroethylene, trifluoroethylene, and tetrafluoroethylene are suitable for imparting fluoro functionality to the polymer. Other fluorinated monomers include 2,2,3,3,4,4,5,5,6,6,7,7-Dodecafluoroheptyl (meth)acrylate, 3,3,4,4,5,5,6,6,7,7,8,8,9,9,10,10,11,11,12,12,12-Heneicosafluorododecyl (meth) acrylate, 3,3,4,4,5,5,6,6,7,7,8,8,9,9,10,10,10-Heptadecafluorodecyl meth(meth)acrylate, 2,2,3,3,4,4,4-Heptafluorobutyl (meth)acrylate, 2,2,3,4,4,4-Hexafluorobutyl (meth)acrylate, 1,1,1,3,3,3-Hexafluoroisopropyl (meth)acrylate, 2,2,3,3,4,4,5,5-Octafluoropentyl (meth)acrylate, 2,2,3,3,3-Pentafluoropropyl (meth)acrylate, 1H,1H,2H,2H-Perfluorodecyl (meth)acrylate, 2,2,3,3-Tetrafluoropropyl (meth)acrylate, 3,3,4,4,5,5,6,6,7,7,8,8,8-Tridecafluorooctyl (meth)acrylate, 2,2,2-Trifluoroethyl (meth)acrylate, and 2-[(1',1',1'-Trifluoro-2'-(trifluoromethyl)-2'-hydroxy)propyl]-3-norbornyl (meth)acrylate.

In certain examples of the present invention, the fluorine-containing polymer (1) may comprise, for example, a (meth) acrylic polymer and/or a copolymer of at least two of vinylidene fluoride, hexafluoropropylene, tetrafluoroethylene and perfluoromethylvinyl ether. In a particular example of the present invention, the fluorine-containing polymer (1) is prepared from a reaction mixture comprising a mixture of fluoro-functional monomers, wherein the mixture of fluoro-functional monomers includes at least one ether functional fluorine-containing monomer such as perfluoromethylvinyl ether.

(Meth)acrylic polymers can be prepared via known organic solution polymerization techniques. Generally any method of producing such polymers that is known to those skilled in the art utilizing art recognized amounts of monomers can be used.

The fluorine-containing polymer (1) typically demonstrates a weight average molecular weight ($M_w$) of 5,000 to 500,000; usually 25,000 to 250,000 Daltons as measured by gel permeation chromatography using a polystyrene standard. Particularly suitable methacrylic polymers include I500101, commercially available from Aculon, Inc.

The fluorine-containing polymer (1) is usually present in the surface treatment composition in an amount of 5 to 25 percent by weight, more often 12.5 to 17.5 percent by weight, based on the total weight of the second component (ii) of the surface treatment composition.

As noted above, the second component (ii) of the surface treatment composition further comprises (2) a solvent containing at least one C—F bond. The solvent (2) can be different from the organic solvent in the first component (i). Examples include hydrofluoroether (HFE) solvents. Such solvents were developed originally as replacements for CFCs, HFCs, HCFCs, and PFCs. An advantage of using an HFE solvent is its short atmospheric lifetime (thus it will not contribute to photochemical smog) and zero ozone depletion potential compared to alternative chemicals.

Examples of particular hydrofluoroether solvents include 1,1,1,2,2,3,3,4,4-nonafluoro-4-methoxybutane and/or 1,1,1,2,2,3,3,4,4-nonafluoro-4-ethoxybutane, commercially available from 3M Corporation as NOVEC 7200. Other exemplary solvents include 3-ethoxyperfluoro(2-methylhexane) (HFE 7500, also available from 3M Corporation); 1H,1H,5H-Octafluoropentyl-1,1,2,2-tetrafluoroethyl ether (HFE 6512, available from Fuxin Hengtong); and/or 1,1,1,2,3,4,4,5,5,5-Decafluoropentane (VERTREL XF, available from E. I. DuPont de Nemours).

The solvent (2) may further comprise a second, different solvent. The second solvent may be any of those disclosed above and may be the same as or different from the organic solvent in the first component (i).

The solvent (2) is usually present in the surface treatment composition in an amount of 75 to 90 percent by weight, more often 75 to 89 percent by weight, based on the total weight of the second component (ii) of the surface treatment composition.

In certain examples of the present invention, the surface treatment composition used to prepare the surface-treated filtration membrane 10 comprises one or more suitable surfactants as known in the art. The surfactant may be present in either or both of the first and second components of the surface treatment composition. Surfactants include materials otherwise known as wetting agents, anti-foaming agents, emulsifiers, dispersing agents, leveling agents etc. Surfactants can be anionic, cationic and nonionic, and many surfactants of each type are available commercially. Some surface treatment compositions include at least a wetting agent. Still other surface treatment compositions may have additional surfactants to perform additional effects.

Other suitable surfactants may also be selected. The amount and number of surfactants added to the surface treatment compositions will depend on the particular surfactant(s) selected, but should be limited to the minimum amount of surfactant that is necessary to achieve wetting of the substrate while not compromising the performance of the dried coating. In certain embodiments, the surface treatment compositions comprise 0.01 up to 10 percent by weight of surfactant, in some embodiments, 0.05 up to 5 percent by weight, or, in yet other embodiments, 0.1 up to 3 percent by weight of surfactant. The amount of surfactant present in the surface treatment compositions can range between any combination of these values inclusive of the recited values. The use of surface treatment compositions in the membranes of the present invention allows for their use in separation systems without the need for pre-wetting of the membrane such as with isopropanol.

The first and second components (i) and (ii) of the surface treatment composition may be applied to the surface of the substrate 12 simultaneously as a single composition. More often, the first component (i) is applied to the surface of the substrate 12 prior to the second component (ii). Applying the first component to the substrate 12 prior to the second component often enhances wetting of the substrate surface, yielding a coating layer 14 with more consistent coverage and thickness over the surface of the substrate 12. In this scenario, the second component (ii) may contain a portion of the organic solvent that is present in the first component (i). For example, t-butyl acetate is miscible with many HFE solvents and may be included in the second component (ii) as a second solvent.

The present invention is further drawn to a method of preparing a surface-treated filtration membrane 10. The method comprises:

(a) contacting a porous substrate 12 with a first component of a surface treatment composition, wherein the first component comprises an organic solvent having a boiling point less than or equal to 100° C.;

(b) subsequently contacting the porous substrate 12 with a second component of the surface treatment composition, wherein the second component comprises:

(1) a fluorine-containing polymer; and (2) a solvent containing at least one C—F bond, wherein the solvent containing at least one C—F bond is different from the organic solvent in the first component; and (c) subjecting the porous substrate 12 to a temperature of 25 to 90° C. for 1 to 180 minutes to form a surface-treated filtration membrane 10.

Prior to contacting the substrate 12 with the surface treatment composition, the substrate 12 may be cleaned such as by argon plasma treatment or with a solvent such as IONOX 13416 or CYBERSOLV 141-R, both available from Kyzen.

In step (a) of the method of the present invention, the porous substrate 12 is contacted with the first component (i) of the surface treatment composition described above. The first component (i) may be applied to the surface of the substrate by one or more of a number of methods such as spraying, dipping (immersion), spin coating, or flow coating onto a surface thereof. Immersion is used most often. Subsequently, in step (b), the porous substrate 12 is contacted with a second component of the surface treatment composition, wherein the second component comprises (1) a fluorine-containing polymer and (2) a solvent containing at least one C—F bond as described above. Again, the second component (i) may be applied to the surface of the substrate by any of the methods noted above, most often by immersion.

After application of both components of the surface treatment composition to the surface of the porous substrate 12 to form a coated substrate, the coated substrate is subjected to a temperature of 25 to 90° C. for 1 to 180 minutes, such as 10 to 120 minutes, or 30 to 60 minutes, to form a surface-treated filtration membrane 10. The coating layer 14 formed on the substrate 12 typically demonstrates a dry film thickness of 0.05 to 10 microns. In certain examples the present invention, the coated substrate max demonstrate average pore sizes of 0.1 to 5 microns, such as 0.2 to 3 microns, or 0.4 to 1 micron, depending on the intended application of the coated substrate in a filtration membrane. La rage pore sizes are also possible.

The membranes of the present invention may be used in a method of separating suspended or dissolved materials from a fluid stream, such as removing one or more contaminants from a fluid (liquid or gaseous) stream, or concentrating desired components in a depleted stream. The method comprises contacting the stream with the membrane, typically by passing the stream through the membrane. Examples of contaminants include toxins, such as neurotoxins; heavy metal; hydrocarbons; oils; dyes; neurotoxins; pharmaceuticals; and/or pesticides. Additionally, the coating layer formed by the surface treatment composition does not detrimentally block the pores of the membrane. Typically, the surface treated filtration membranes of the present invention exhibit at least 50% of air flow, often at least 80% of air flow compared to similar filtration membranes that have not been surface treated, while demonstrating enhanced oil repellency in comparison. Air permeability rates of at least 2 $ft^3$/min may be der demonstrated by surface treated filtration membranes of the present invention. The surface-treated filtration membranes of the present invention, and as formed by the method described above, usually demonstrate an AATCC Oil Repellency Grade of 8 when subjected to AATCC Test Method 118-1997.

Whereas particular embodiments of this invention have been described above for purposes of illustration, it will be evident to those skilled in the art that numerous variations of the details of the present invention may be made without departing from the scope of the invention as defined in the appended claims.

What is claimed is:

1. A method of preparing a surface-treated filtration membrane comprising:

(a) contacting a porous polymeric substrate with a first component of a surface treatment composition, wherein the first component comprises an organic solvent having a boiling point less than or equal to 100° C. at atmospheric pressure and which comprises t-butyl acetate;

(b) subsequently contacting the porous polymeric substrate with a second component of the surface treatment composition, wherein the second component comprises:
(1) a fluorine-containing polymer;
(2) a solvent containing at least one C—F bond, wherein the solvent (2) is different from the organic solvent in the first component; and
(3) the organic solvent having a boiling point less than or equal to 100° C. at atmospheric pressure that is also present in the first component; and (c) subjecting the porous polymeric substrate to a temperature of 25 to 90° C. for 1 to 180 minutes to form a surface-treated filtration membrane.

2. The method of claim 1, wherein the substrate comprises an air filter.

3. The method of claim 1, wherein the organic solvent in the first component has a boiling point of at least 50° C. at atmospheric pressure.

4. The method of claim 1, wherein the fluorine-containing polymer (1) comprises a (meth)acrylic polymer and/or a copolymer of at least two of vinylidene fluoride, hexafluoropropylene, tetrafluoroethylene and perfluoromethylvinyl ether.

5. The method of claim 4, wherein the fluorine-containing polymer (1) is prepared from a reaction mixture comprising a mixture of fluoro-functional monomers, wherein the mixture of fluoro-functional monomers includes at least one ether functional fluorine-containing monomer.

* * * * *